United States Patent
Robbins

[11] 3,713,672
[45] Jan. 30, 1973

[54] MOTORCYCLE TO TOWING VEHICLE HITCH

[76] Inventor: Harold Robbins, 105 Graymoor Lane, Olympia Fields, Ill. 60461

[22] Filed: Nov. 12, 1970

[21] Appl. No.: 88,902

[52] U.S. Cl. .................280/292, 224/39 R, 280/411, 280/413
[51] Int. Cl. .............................................B62h 1/00
[58] Field of Search ..280/292, 411, 412, 413, 460 R; 224/30, 39 R

[56] References Cited

UNITED STATES PATENTS

| | | | |
|---|---|---|---|
| 862,936 | 8/1907 | Phillips | 280/292 X |
| 2,216,584 | 10/1940 | Boden | 280/460 R |
| 1,118,679 | 11/1914 | Pawsat | 280/291 |
| 656,998 | 8/1900 | McDonald et al. | 280/292 |
| 1,954,361 | 4/1934 | Lewter | 280/292 |
| 718,322 | 1/1903 | Davis | 280/292 |
| 3,428,332 | 2/1969 | McCance | 280/292 |
| 2,153,876 | 4/1939 | Roseman | 280/412 X |

FOREIGN PATENTS OR APPLICATIONS

| | | | |
|---|---|---|---|
| 1,008,597 | 5/1952 | France | 280/411.3 |
| 1,152,932 | 2/1958 | France | 280/460 R |

*Primary Examiner*—Leo Friaglia
*Assistant Examiner*—John P. Silverstrim
*Attorney*—Silverman & Cass

[57] ABSTRACT

A hitch for towing a motorcycle by an automobile which comprises a pair of brackets mounted spaced along a horizontally arranged structural member, such as an automobile rear bumper, a pair of tow bars, each tow bar pivotally mounted to a respective one of said brackets to permit only vertical oscillation thereof, the opposite ends of each of said tow bars being secured at a second pivot connection likewise to permit only vertical oscillation, to a clamping means attached to the front fork of the motorcycle, whereby lateral movement of the front wheel of the motorcycle is prevented with resultant stability of the motorcycle during tow.

7 Claims, 7 Drawing Figures

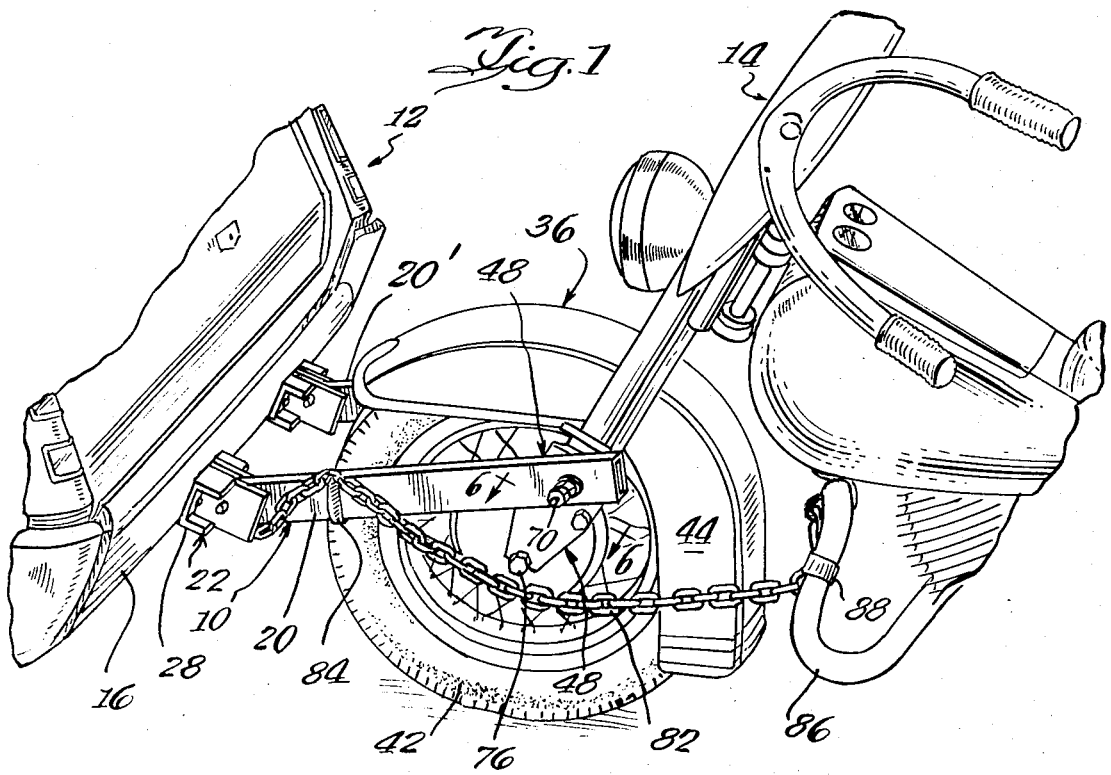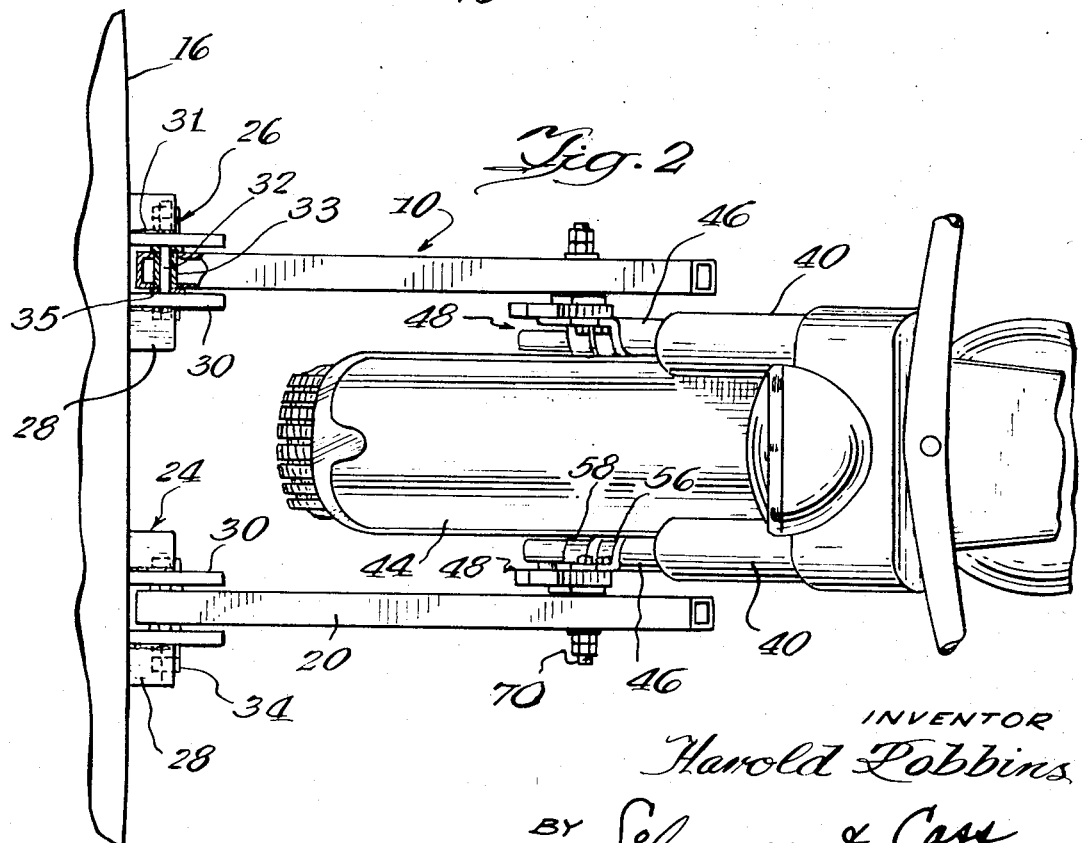

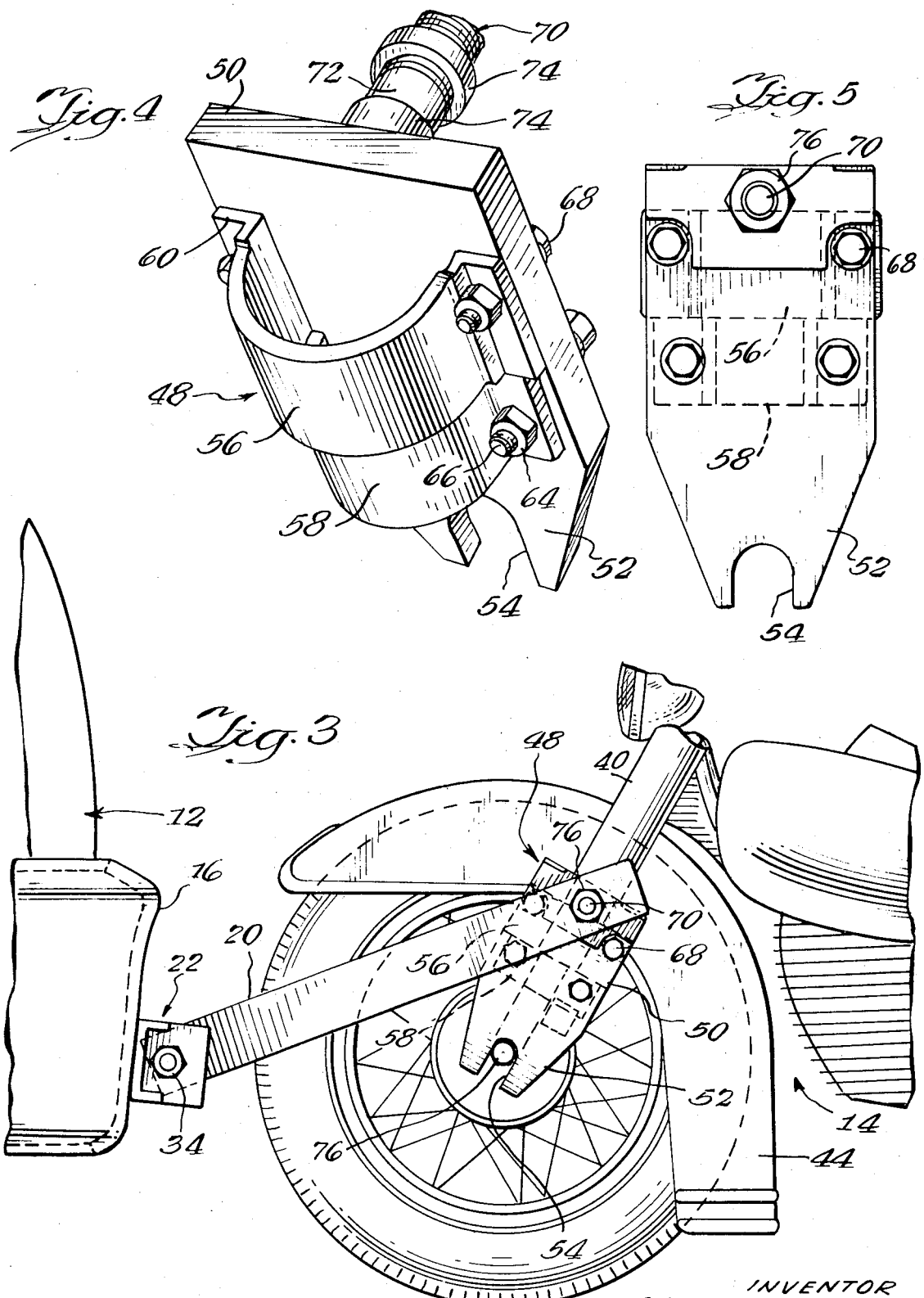

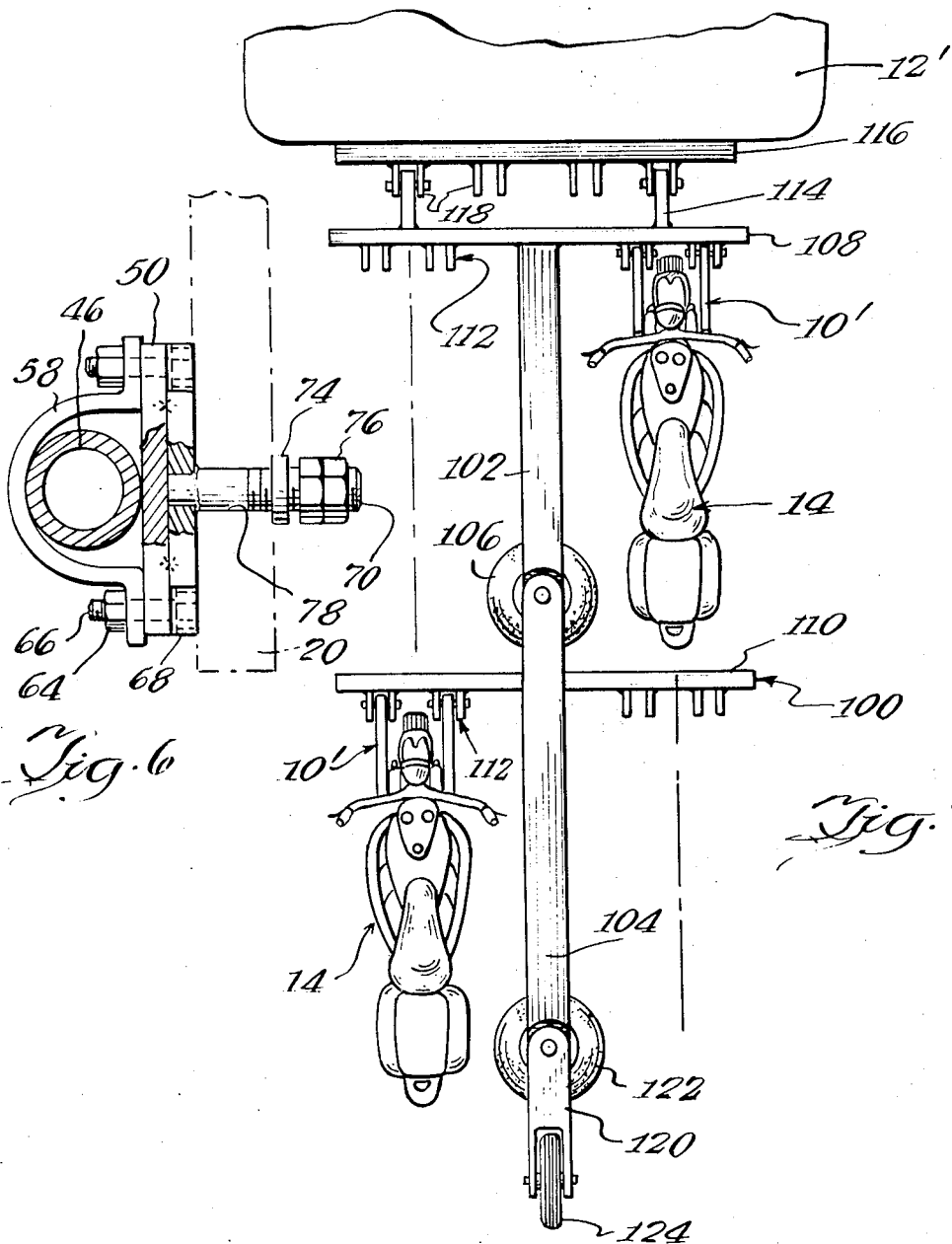

3,713,672

MOTORCYCLE TO TOWING VEHICLE HITCH

BACKGROUND OF THE INVENTION

This invention relates generally to means for towing motorcycles and the like by attachment to a driven towing vehicle such as an automobile. Particularly, the invention is concerned with the provision of a hitch having means whereby lateral movement thereof and of the front wheel of the motorcycle is prevented, said means being characterized by means for pivotally coupling the tow bars of said hitch to the automobile and to the motorcycle so as to permit only vertical oscillation of the bars about the pivot axes.

One of the considerable difficulties of towing a motorcycle by attaching same to a conventional hitch is the instability of the motorcycle encountered during tow. Difficulty arises in keeping the motorcycle erect, say during turning for example, where the cycle has a tendency to tilt laterally and therefore may be dragged with substantial damage being incurred thereto.

The invention herein provides a solution to the above mentioned problem by mounting the tow bars of the hitch structure in such a manner to prevent lateral movement of the towbars, and hence, maintain the vertical stability of the towed cycle.

Other advantages of the structure provided by the invention include the provision of a hitch whereby the motorcycle rides on all wheels during tow providing better tracking than heretofore possible; which enables the utilization of shock absorber means provided on the motorcycle to enable better control of the towed vehicle; which is easy and economic to fabricate; which is versatile in that it can be connected to different structural portions of the towing vehicle and which can be utilized, with small change, to enable the towing of a plurality of motorcycles.

SUMMARY OF THE INVENTION

A towing hitch comprising bracket means secured to a structural member attached or capable of attachment to the towing vehicle, at least a pair of tow bars extending rearwardly from the towing vehicle and clamp means secured to the towed vehicle, and means to establish first and second pivot connections adjacent respective ends of each of said tow bars and connecting said bracket means and said clamp means respectively thereto permitting only vertical oscillation of said bars about the pivot axes.

BRIEF DESCRIPTION OF THE DRAWINGS

FIG. 1 is a perspective view of the towing hitch according to the invention as installed attached to an automobile and to a motorcycle.

FIG. 2 is a plan view of the towing hitch shown in FIG. 1.

FIG. 3 is an enlarged side elevational view of the arrangement shown in FIG. 1.

FIG. 4 is a enlarged perspective view of the clamping member utilized in accordance with the invention.

FIG. 5 is an elevational view of the clamping member illustrated in FIG. 4 and taken from the outside of the wheel illustrated in FIG. 3.

FIG. 6 is a sectional view taken along lines 6—6 of FIG. 1 and in the direction indicated.

FIG. 7 is a plan view of a modified embodiment of the invention adapted for towing a plurality of motorcycles.

DESCRIPTION OF PREFERRED EMBODIMENTS

The motorcycle to towing vehicle hitch device constructed in accordance with the invention is illustrated in FIG. 1 and designated generally by reference character 10. The hitch device 10 is shown connected at the rear of the towing vehicle, here automobile 12, for use in towing a motorcycle 14. The device 10 is connected to the rear bumper 16 of automobile 12 and to the front fork 18 of the motorcycle 14 by means of tow bars 20 and 20' which are mounted for solely vertical oscillation, lateral movement of the front wheel being positively prevented. In this way, the motorcycle 14 is maintained erect during towing and tracks properly behind the towing vehicle.

Bracket means 22 is provided on the rear bumper 16 to establish the connection between the tow bars and the said rear bumper 16. The bracket means 22 takes the form of at least two ear pairs 24 and 26, each pair being secured rigidly to the rear bumper 16 in spaced relation one to the other. Each ear pair 24 and 26 comprises U-shaped portions 28 which are fastened to the rear bumper 16 and upstanding portions 30 of rectangular configuration welded, as at 31, to the U-shaped portions 28. The U-shaped portions 28 serves to brace the upstanding portions 30, the latter hereinafter being referred to as ears. The ears 30 of the ear pairs 24 and 26 are arranged parallel one to the other spaced apart sufficiently to receive one of the ends respectively of the tow bars 20 and 20' therebetween. A shaft 32 is passed through the ears 30 and respective tow bars 20 and 20'. A bushing 33 is mounted on shaft 32 with washers 35 mounted adjacent the bushing and on both sides of the tow bars to space the latter from the ears. The shaft 32 here comprises a hollow bolt with the assembly being completed by tightening of the nut 34. Thus each tow bar 20 and 20' is connected to the automobile rear bumper 16 in a pivot connection which, because of the restraint offered by the ears 30, and the substantial thickness of the two bars, permits little if any lateral movement of the tow bars at their respective couplings to the automobile 12. The tow bars 20 and 20' can move only vertically about their respective pivot axes. It should be noted that the tow bars 20 and 20' are each of elongate hollow, generally rectangular configuration, and have substantial thickness.

The tow bars 20 and 20' when pivotally mounted to the bracket means 22 extend rearwardly of the automobile and are coupled, at their opposite ends, to opposite sides of the front wheel assembly (generally designated by reference character 36) of the motorcycle 12. The motorcycle 12 conventionally has a front fork 38 including a pair of tubular fork members 40 straddling the front wheel 42 and fender 44. The fork members 40 generally include shock absorbers in the upper parts thereof. The tow bars 20 and 20' are mounted to the lower parts 46 of the fork member 40 by pivot connection to clamping members 48. For ease in description of the clamping members 48, the side facing the wheel 42 shall be referred to as the inside while the side facing away from the wheel 42 shall be referred to as the outside.

Referring to FIGS. 3 to 6, each clamping member 48 has a support plate 50 of generally rectangular configuration and a thickness approximating that of the ears 30. The plate 50 also is provided with a tapered end portion 52 carrying a notch 54 therein opening downwardly of said plate 50. A pair of arcuate bands 56 and 58, each having bent end flanges 60 and 62 respectively removably are secured side by side to the inside surface of plate 50. Band 58 is smaller than band 56 to compensate for the descending taper of the lower parts 46 of fork members 40 and each band engages the said part 46 and is fastened to the plate 50 by means of nuts and bolts 64 and 66, the heads 68 of the bolts being on the outside of plate 50. A stub shaft 70 is secured to the outside surface of plate 50 and carries a bushing 72 with a pair of washers 74 on opposite sides thereof. The stub shaft 70 is threaded at its free end to receive a nut 76. Each tow bar is provided with a through passageway 78 adapted to receive the stub shaft 70 and its associated bushing 72, and is mounted thereon subsequent to the assembly of the clamping member 48 to the lower parts 46 of the front fork 40. The notches 54 of each of the plates 50 engage the associated hubs 80 of the front wheel 42 to prevent the clamping members 48 from sliding downwardly. Thus, the tow bars 20 and 20' are permitted to move vertically about their pivot axes at the respective pivot connections to the clamping members 48 with lateral movement of the bars at that location being prevented by plates 50 and the heads 68 of bolts 66. Since the clamping members 48 are secured to the lower parts 46 of the fork member 40, during towing, the motorcycle 12 rides with the shock absorbing qualities normally encountered in use on said motorcycle. It should also be noted that during towing, using the hitch device 10, the motorcycle 12 is not only maintained erect, but rides on all wheels. This results in greater tracking response to the movement of the pulling automobile. A chain 82, normally legally required in all towing operations, is illustrated connected to one end of the tow bar 20 by tape 84 and to a structural element 86 of the motorcycle 12 by means of tape 88.

Instead of bracket means 22 being secured to the rear bumper of the automobile, a structural member such as an angle iron length can be fastened to the rear frame or to the rear axle of the automobile, and the ear pairs rigidly secured thereto.

The embodiment illustrated in FIGS. 1 to 3 is intended to enable the towing of a single motorcycle. Often it is desired to tow more than one motorcycle and for this purpose, one may utilize the modified version of the invention illustrated in FIG. 7 and generally designated by reference character 100. The towing frame or rig 100 comprises a pair of elongate structural members 102 and 104 arranged end to end as a spine and coupled by means of swivel connection 106. Each of the elongate members 102 and 104 have secured thereto cross members 108 and 110, likewise formed of angle iron or the like to define motorcycle bays. The cross members are arranged parallel one to the other and horizontally normal to the elongate members 102 and 104. Each of the cross-members 108 and 110 have secured thereto bracket means 112 identical to the bracket means 22 heretofore described. The cross member 108, being closest to the towing vehicle, automobile 12', has forwardly extending stub members 114 of generally rectangular configuration.

A structural member 116 is fastened to the rear of automobile 12' and carries bracket means 118 identical to bracket means 22 heretofore described. The stub members 114 are coupled to the bracket means 118 in the same manner that the tow bars 20 and 20' are coupled to said bracket means 22, that is in a pivot connection whereat only vertical oscillation is permitted. Structure identical to hitch device 10 is provided for each motorcycle to be towed, the cross members 108 and 110 defining bays or berths on opposite sides of the elongate members 102 and 104 of the rig 100, each bay adapted to accommodate a motorcycle therein. the motorcycles are joined to the cross members 108, 110 by hitch devices 10' identical to the hitch device 10. A trailing section 120 is coupled to the free end of elongate member 104 by means of swivel coupling 122 and carries a trailing wheel 124 journaled thereon.

I claim:

1. A towing vehicle to motorcycle hitch for use in towing motorcycles of the type having a front wheel supporting fork including portions straddling the front wheel, said hitch comprising, bracket means at one end of the hitch adapted to be secured to said towing vehicle, clamp means including rigid support plate means, adapted to be secured to the fork portions of the vehicle, at least a pair of substantially parallel tow bars arranged on opposite sides of the front wheel, a first pivot connection securing said tow bars respectively to said bracket means, and a second pivot connection securing said tow bars respectively to said clamp means at their ends opposite to said first pivot connection, said rigid support plate means being disposed between the respective fork portions and the tow bars, movement of said tow bars being limited to vertical oscillation about the respective pivot axes whereby lateral movement of said tow bars substantially is eliminated and said motorcycle is maintained erect during tow and said clamp means comprise a pair of clamps secured respectively to said fork portions on opposite sides of the wheel, said clamps each further including means arranged for encircling disposition about a fork portion, and said rigid support place means comprises a support plate, means for fastening said encircling means to said support plate and stub shaft means extending outwardly of said support plate on the side thereof opposite to said encircling means, said stub shaft means including bearing means and said tow bar being mounted on said bearing means to constitute said second pivot connection.

2. The hitch as claimed in claim 4 in which said bracket means comprises at least a pair of ear pairs, each pair being arranged to receive a tow bar therebetween and bearing means engageable through said ears and tow bar, said tow bar being journaled therebetween to constitute said first pivot connection.

3. The hitch as claimed in claim 2 and a rigid structure connected directly to the towing vehicle and said bracket means is secured to said rigid structure.

4. The hitch as claimed in claim 1 in which said towing vehicle comprises a frame construction comprising a spine member and at least one cross member secured thereto, said one cross member having bar means extending forwardly thereof and being coupled to said bracket means for vertical pivotal movement about the pivot axes and a plurality of hitches associated with said cross member.

5. The hitch as claimed in claim 4 in which there are plural cross members and motorcycle bays are defined by said cross members on opposite sides of said spine, the cross member of each bay carrying bracket means thereon.

6. A towing vehicle to motorcycle hitch for use in towing motorcycles of the type having a front supporting fork including portions straddling the front wheel, said hitch comprising, bracket means at one end of the hitch adapted to be secured to said towing vehicle, clamp means adapted to be secured to the fork portions of the vehicle, at least a pair of tow bars arranged on opposite sides of the front wheel, first and second pivot connections securing said tow bars respectively to said bracket means and said clamp means for solely vertical oscillation about the respective pivot axes, said clamp means comprising a pair of clamps secured respectively to said fork portions on opposite sides of the wheel, said clamps each including band means arranged for encircling disposition about a respective fork portion, a support plate, means for fastening said band to said support plate and stub shaft means extending outwardly of said support plate on the side thereof opposite to said band means, said stub shaft means including bearing means adapted to mount said tow bar to define said second pivot connection and said support plates each include a notched portion, and said motorcycle wheel includes hub means, said notched portion adapted to engage said hub means to prevent downward sliding of said clamp subsequent to installation thereof, lateral movement of said tow bars being substantially eliminated with said motorcycle being maintained erect during tow.

7. The hitch as claimed in claim 5 in which said band means includes at least a pair of bands of differing size, each having flange means at the ends thereof and said fastening means removably securing said flange means to said plate with the band about the lower part of said fork portion.

* * * * *